United States Patent
Liao et al.

(10) Patent No.: US 12,401,191 B2
(45) Date of Patent: Aug. 26, 2025

(54) PROTECTION CIRCUITS FOR INTERFACES

(71) Applicant: Hewlett-Packard Development Company, L.P., Spring, TX (US)

(72) Inventors: Po Cheng Liao, Taipei (TW); Chien Hao Lu, Taipei (TW); Hsin Tso Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 155 days.

(21) Appl. No.: 17/794,159

(22) PCT Filed: Jan. 22, 2020

(86) PCT No.: PCT/US2020/014578
§ 371 (c)(1),
(2) Date: Jul. 20, 2022

(87) PCT Pub. No.: WO2021/150220
PCT Pub. Date: Jul. 29, 2021

(65) Prior Publication Data
US 2023/0352933 A1    Nov. 2, 2023

(51) Int. Cl.
*H02H 9/04* (2006.01)
*H05F 3/02* (2006.01)

(52) U.S. Cl.
CPC .............. *H02H 9/046* (2013.01); *H05F 3/02* (2013.01)

(58) Field of Classification Search
CPC ............. H02H 9/046; H02H 9/04; H05F 3/02
USPC ........................................................... 361/56
See application file for complete search history.

(56) References Cited

U.S. PATENT DOCUMENTS

| | | | | |
|---|---|---|---|---|
| 4,262,254 | A | * | 4/1981 | Poss ....................... G01R 29/24 324/72 |
| 5,745,324 | A | * | 4/1998 | Forsland ................ H02H 9/046 361/111 |
| 5,995,353 | A | | 11/1999 | Cunningham et al. |
| 6,859,351 | B2 | | 2/2005 | Byrne et al. |
| 7,948,726 | B2 | | 5/2011 | Troemel, Jr. et al. |

(Continued)

FOREIGN PATENT DOCUMENTS

CA    2984061 A1 *  6/2018  .............. H01C 7/12
CN    202632551 U  * 12/2012

(Continued)

OTHER PUBLICATIONS

CN 208423787; Title; Vehicle mount debug interface protect circuit main body two capacitor transistor four resistors and second fix fourth; Entire drawings and specification (Year: 2019).*

(Continued)

*Primary Examiner* — Dharti H Patel
(74) *Attorney, Agent, or Firm* — Quarles & Brady LLP

(57) ABSTRACT

Examples of a protection circuit for an interface are described. In an example, the protection circuit comprises an electrostatic discharge (ESD) module. The ESD module suppresses a discharge voltage caused due to an electrostatic discharge. The ESD module may be further coupled to a capacitive element and a resistive element. The capacitive element is to route discharge voltage caused due to an electrostatic discharge, while the resistive element is to route a reverse DC operated voltage.

18 Claims, 4 Drawing Sheets

(56) References Cited

U.S. PATENT DOCUMENTS

| | | | |
|---|---|---|---|
| 8,174,482 B1* | 5/2012 | Yeung | G09G 3/3406 |
| | | | 345/87 |
| 8,199,447 B2 | 6/2012 | Gee et al. | |
| 8,208,233 B2 | 6/2012 | Lin | |
| 8,878,602 B1* | 11/2014 | Hsu | H04B 3/32 |
| | | | 327/552 |
| 9,343,455 B2 | 5/2016 | Gueorguiev et al. | |
| 9,703,422 B2 | 7/2017 | Shih et al. | |
| 10,917,084 B2* | 2/2021 | Lee | H03K 17/08 |
| 11,355,924 B2* | 6/2022 | Domanski | H02H 9/046 |
| 11,502,505 B2* | 11/2022 | Kim | H04M 1/0274 |
| 11,686,758 B2* | 6/2023 | Varga | H02H 3/16 |
| | | | 361/93.1 |
| 11,764,569 B2* | 9/2023 | Dong | H04B 3/548 |
| | | | 361/118 |
| 11,777,304 B2* | 10/2023 | Surajit | B60L 3/04 |
| | | | 361/91.6 |
| 2004/0080881 A1* | 4/2004 | Chou | H02H 9/046 |
| | | | 361/56 |
| 2004/0157474 A1* | 8/2004 | Rapaich | G06F 1/266 |
| | | | 439/43 |
| 2006/0139832 A1* | 6/2006 | Yates | H02H 9/042 |
| | | | 361/111 |
| 2008/0310065 A1* | 12/2008 | Ho | H10D 84/204 |
| | | | 361/91.5 |
| 2009/0267411 A1* | 10/2009 | Wang | H02J 7/0029 |
| | | | 361/18 |
| 2010/0246075 A1* | 9/2010 | Chao | H02H 9/004 |
| | | | 361/89 |
| 2011/0012747 A1* | 1/2011 | Hsieh | H05K 9/0067 |
| | | | 340/815.45 |
| 2011/0279935 A1* | 11/2011 | Iwasa | H03H 7/427 |
| | | | 361/56 |
| 2012/0026018 A1* | 2/2012 | Lin | G06F 13/4068 |
| | | | 341/26 |
| 2013/0120334 A1* | 5/2013 | Kim | G09G 3/3688 |
| | | | 345/208 |
| 2014/0340807 A1* | 11/2014 | Kularatna | H02H 9/005 |
| | | | 361/118 |
| 2015/0207312 A1* | 7/2015 | Wang | H02H 9/046 |
| | | | 361/56 |
| 2015/0229119 A1* | 8/2015 | Tao | H02H 1/0007 |
| | | | 361/91.1 |
| 2015/0357812 A1* | 12/2015 | Wiemeyer | A63H 19/10 |
| | | | 361/54 |
| 2017/0373493 A1* | 12/2017 | Morf | H02H 9/046 |
| 2018/0269676 A1* | 9/2018 | Lo | G01N 27/226 |
| 2023/0318288 A1* | 10/2023 | Dai | H02H 9/06 |
| | | | 361/205 |

FOREIGN PATENT DOCUMENTS

| | | | | |
|---|---|---|---|---|
| CN | 102298101 B | * | 4/2013 | |
| CN | 205595780 U | | 9/2016 | |
| CN | 104881391 B | | 9/2017 | |
| CN | 206473318 U | * | 9/2017 | |
| CN | 208190247 U | * | 12/2018 | |
| CN | 208423787 U | * | 1/2019 | |
| CN | 208522461 U | * | 2/2019 | |
| CN | 208547935 U | * | 2/2019 | |
| CN | 110650068 A | * | 1/2020 | |
| CN | 210985652 U | * | 7/2020 | |
| CN | 215219469 U | * | 12/2021 | |
| CN | 111130085 B | * | 9/2022 | H02H 9/045 |
| CN | 115313340 A | * | 11/2022 | |
| CN | 115443055 A | * | 12/2022 | H05K 9/0007 |
| CN | 218412692 U | * | 1/2023 | |
| CN | 116054111 A | * | 5/2023 | |
| EP | 1491014 B1 | | 10/2008 | |
| EP | 3716400 A1 | * | 9/2020 | H01Q 1/243 |

OTHER PUBLICATIONS

CN 206473318; Title; Electro cardio signal collect circuit intelligence bracelet first pin connect analogue ground through electrostatic discharge forming buffer inductor; (Year: 2017).*

Xiao N; CN 208190247; Title: RS232 Protection circuit has first resistor whose input end is connected with interface terminal and capacitor connected with back working circuit; and transformer whose interface output end is connected with another capacitor; Drawings and specification (Year: 2018).*

Jiang Z; Title: USB interface module of learning machine circuit; Entire specification and drawings; (Year: 2012).*

* cited by examiner

PROTECTION CIRCUITS FOR INTERFACES

BACKGROUND

In computing devices, an interface is a shared boundary through which various other electronic devices, such as peripheral devices, may be connected to the computing device. Interfaces, such as USB-C type interfaces, besides connecting a computing device with other devices, may enable other functionalities such as data transfer and signal transfer over multiple protocols, such as USB protocol and DisplayPort (DP) protocol, and in certain cases also implement power transfer.

Figure 1:
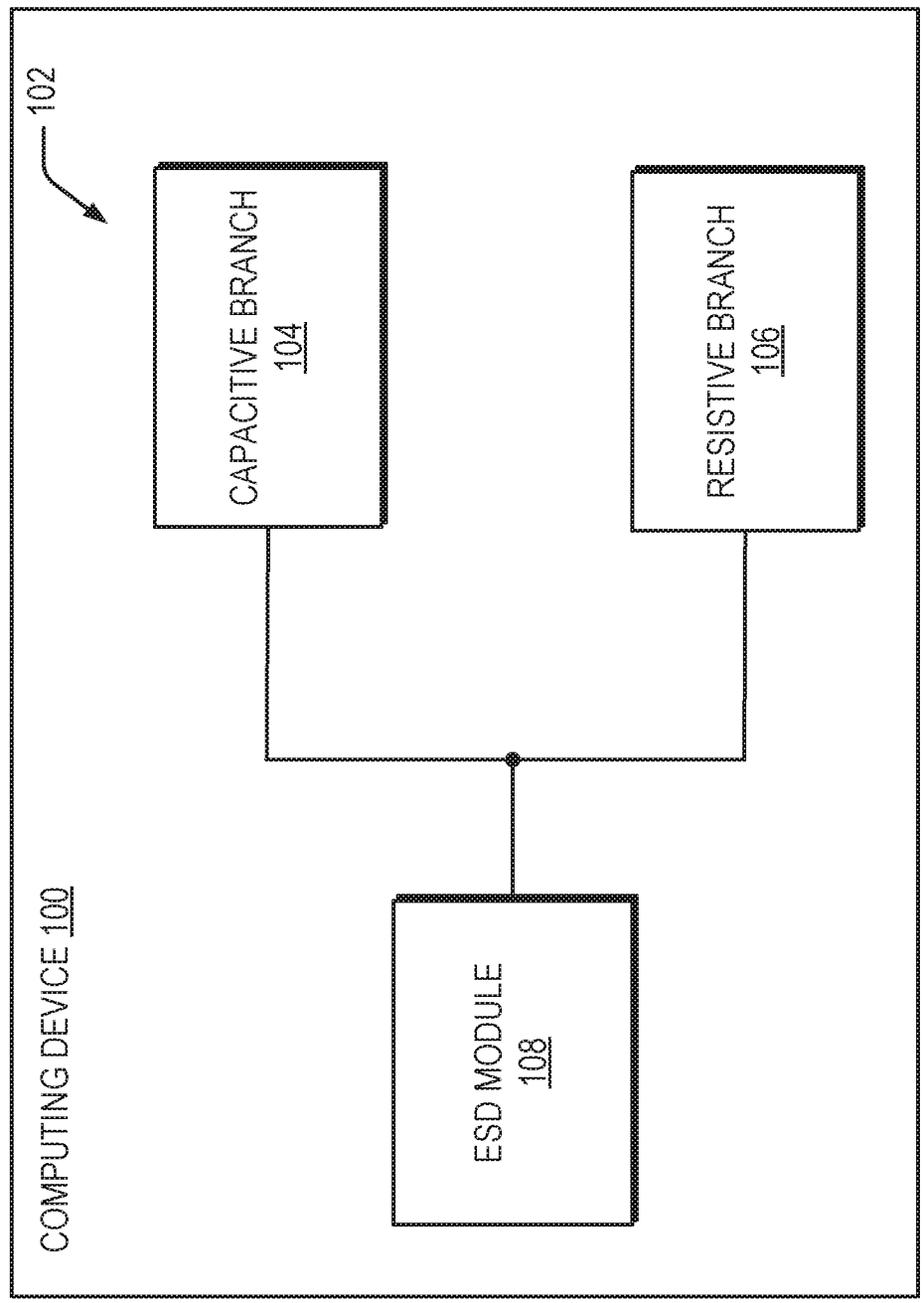
FIG. 1 illustrates block diagram of a computing device with a protection circuit for an interface, as per an example of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description, and the description is not limited to the examples or implementations provided in the drawings.

DETAILED DESCRIPTION

Computing devices, such as a desktop personal computer (PC) or a laptop, may be coupled with various types of electronic devices. Such a coupling may be achieved through interfaces. Interfaces may support multiple functionalities, such as data transfer, and power transfer. As a result, a single cable corresponding to an interface may be used for data transfer or for power transfer to charge the computing device. An example of such an interface includes, but may not be limited to, a Universal Serial Bus (USB) Type-C interface. Other examples may include High Definition Multimedia Interface (HDMI), a Video Graphic Array (VGA) interface, and a Digital Visual Interface (DVI).

The multiple functionalities which may be performed are enabled through a series of distinct connection pins provided within the interfaces. For example, a certain set of pins may be used for transferring power, while another set of pins may be configured for transferring data, and so on. When a receptacle of the interface receives a corresponding connector or plug, the pins provided in the receptacle and the plug electrically couple to allow a specific function, such as data transfer, to be performed. Modern computing devices are now having a small and sleek form factor, which has resulted in the decrease in size of the interfaces (and the corresponding connectors), as well. Since the plug and receptacle of the interface may be sleek and compact in size, different pins within the receptacle and the plug may be situated within close proximity of each other.

As the computing device is used, the interfaces provided on the computing device may be prone to accumulation of electric charge and, as a result of which, an electrostatic discharge or ESD may occur between the plug and the receptacle of the interface upon contact. ESD may occur in the computing devices when a user attempts to plug in or unplug an electronic device from the computing device. ESD, when it occurs, may produce a voltage spike. Such a voltage spike, in turn, may cause permanent damage to electrical components and circuitry within the computing device, or within the electronic device, which may be connected to the computing device.

As mentioned previously, the adjacent connector pins within the plug and the receptacle of the interface may be in close proximity with respect to each other. In certain cases, if the plug is not oriented or aligned appropriately while being inserted into the receptacle, it may result in an inadvertent electrical contact between incorrect pins of the plug and the receptacle. This may cause a reverse voltage of DC current (referred to as reverse DC voltage) to flow through the incorrectly connected pins. Since the reverse DC voltages may be as high as 20 volts (V), in some cases it may expose pins and connected components to voltages that may be more than permitted levels for such devices. For example, owing to an incorrect connection between the pins of the plug and the receptacle, high reverse DC voltage, which may measure about 20 V, may flow into the electronic device being connected.

The computing device may be provided with protection circuits for preventing any resulting damage that may occur due to the ESD. Certain other protection circuits may be further present within the computing device, which provide protection against reverse DC voltages. However, such circuits are implemented separately. Furthermore, the protection circuits intended to tackle a certain electrical anomaly (such as ESD) may not be sufficient for the prevention of another type of electrical anomaly (such as reverse DC voltages). For example, certain protection circuits against ESD may only prevent high alternating current or AC ESD(i.e., a voltage spike having a high peak), but may not be sufficient for preventing or blocking the reverse DC voltages. Furthermore, such protection circuits may operate at high DC voltages and thus are expensive. In other instances, the reverse DC operated voltage may be blocked by utilizing a high capacitive element within the protection circuits for ESD. In such cases, a high capacitive element within the protection circuits for ESD may have an adverse impact on the signal being transmitted through the interface.

Examples of protection circuits for interfaces, are described. In an example, the protection circuits may include a first circuit branch and a second circuit branch. The first circuit branch comprises a capacitive element whereas the second circuit branch comprises a resistive element having a high resistance value, for example, in the range of kilo-ohms (kΩ). The first circuit branch and the second circuit branch are connected to an ESD module. The ESD module may be further coupled to an input line. In an example, the ESD module is to suppress an ESD produced at the input line of the interface. The ESD may result in the generation of a discharge voltage, in the form of a voltage spike. In the event that the ESD occurs, the generated voltage spike is routed through the ESD module and the first circuit branch, through which it is eliminated. In an example, the capacitive element may be about 100 nanofarads (nF).

In certain cases, a reverse current owing to a reverse DC operated voltage may be produced, due to an inadvertent contact between pins of the plug and the receptacle. In such a case, the reverse current may flow through the second circuit branch having the high resistive element. The value of the resistance of the second circuit branch may be such that it is greater than a predefined threshold. Owing to the high resistive element, the voltage drop across the high resistive element is also high causing to protect against the reverse voltage in the protection circuit. In an example, the ESD module is operated at low DC voltages.

The capacitive element may be implemented using either a single capacitor, variable capacitor, or a combination of multiple capacitors. In a similar manner, the resistive element may be implemented using either a single resistor, a variable resistor, or a combination of multiple resistors. The aforementioned configuration of the protection circuit facilitates the protection from ESD, as well as any reverse voltage that may arise during the use of the interfaces of the computing device.

The above aspects and other examples are further described in conjunction with the figures, and in associated description below. It may be noted that the description and the figures merely illustrate principles of the present subject matter. Therefore, various arrangements that encompass the principles of the present subject matter, although not explicitly described or shown herein, may be devised from the description, and are included within its scope.

FIG. 1 illustrates a block diagram of a computing device 100 with a protection circuit 102 for an interface, in accordance with an example of the present subject matter. As would be explained, the protection circuit 102 facilitates protection against ESD, as well as any reverse DC operated voltage that may arise during the use of the interfaces of the computing device 100.

Within the computing device 100, the protection circuit 102 comprises a sanch 104 and a resistive branch 106. In an example, the capacitive branch 104 may be implemented using either one of a capacitor, a variable capacitor, and combination of multiple capacitors, such that the capacitance of the capacitive branch 104 is of a predefined value. In a similar manner, the resistive branch 106 may further include one of a resistor, a variable resistor, or a combination of multiple resistors, such that the impedance of the resistive branch 106 is another predefined value. The capacitance of the capacitive branch 104 and the electrical resistance of resistive branch 106 may be such that the impedance of the capacitive branch 104 is less than the impedance offered by the resistive branch 106. In an example, the capacitive branch 104 comprises a capacitive element having a capacitance of a value of 100 nF, and the resistive branch 106 comprises a resistive element having an electrical resistance of a value greater than 10 kΩ.

Continuing with the present example, the capacitive branch 104 and the resistive branch 106 may be further connected to an ESD module 108. The ESD module 108 may be further coupled to a plurality of input lines (not shown in FIG. 1). Examples of such input lines include, but are not limited to, a data line, a control line, and a power line. On occurrence of an ESD, a resulting discharge voltage may be generated. The discharge voltage may be in the form of a voltage spike. The discharge voltage, once generated, passes through the ESD module 108, which suppresses the discharge voltage. In an example, suppressing the discharge voltage involves limiting the peak voltage of the discharge voltage to a certain value. In an example, the ESD module 108 may suppress the discharge voltage to a reference voltage. Once suppressed, the discharge voltage may be routed through the capacitive branch 104. In an example, the capacitive branch 104 may be further coupled to ground, as a result of which the discharge voltage is grounded, and may be eliminated.

In another example, it may be the case that a reverse DC operated voltage may occur owing to improper alignment when a plug of the interface is inserted into a corresponding receptacle. The reverse DC operated voltage may then be routed through the resistive branch 106. As the reverse DC operated voltage flows through the resistive branch 106, the impedance offered by the resistive branch 106 results in an electrical potential drop which reduces the reverse DC operated voltage. The potential drop in the reverse DC operated voltage is based on the impedance offered by the resistive branch 106. To such an end, the impedance of the resistive branch 106 may be such that the reverse DC operated voltage reduces to a value which is less than a predefined permissible limit.

Figure 2:
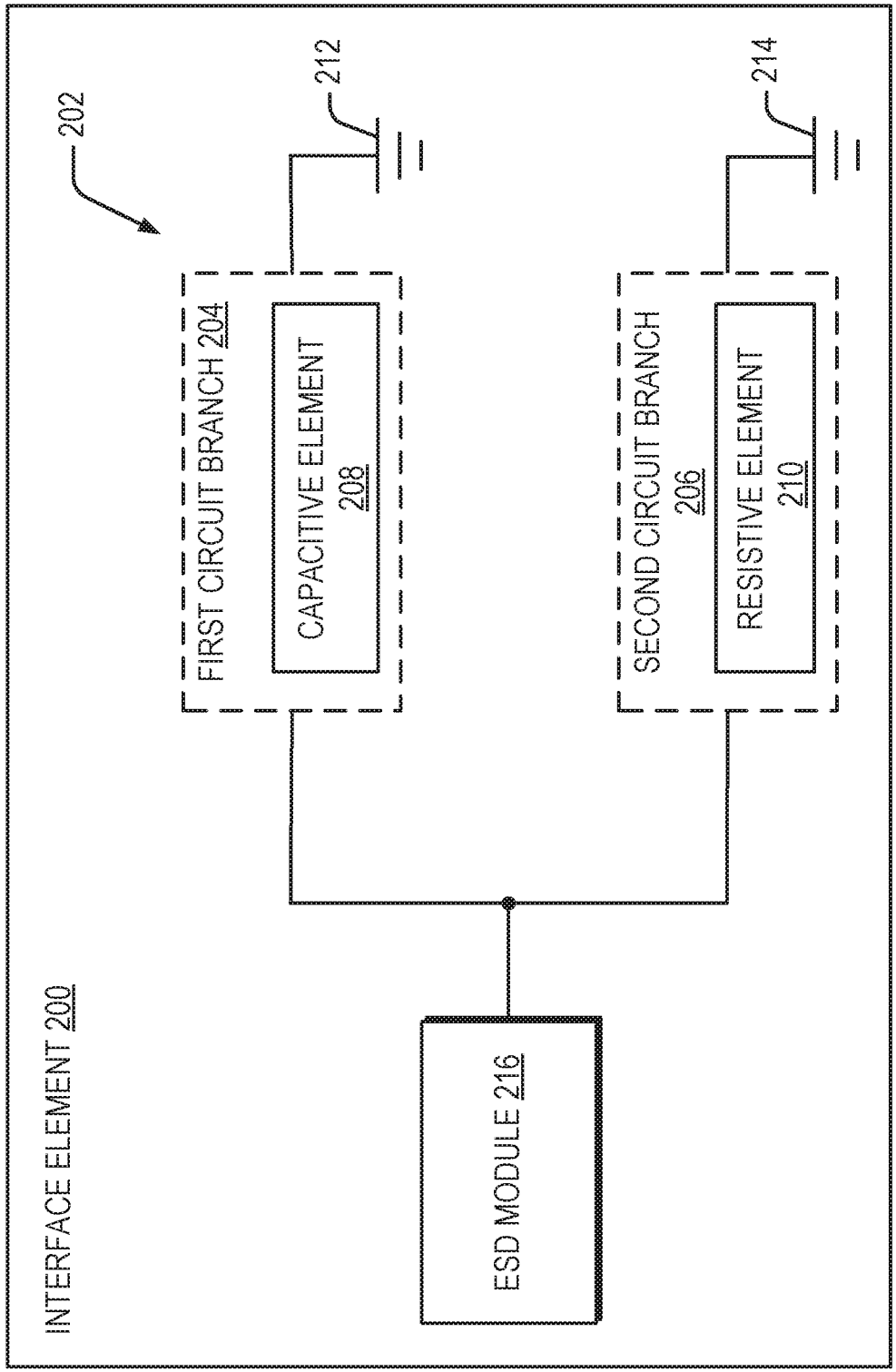
FIG. 2 illustrates a block diagram of an interface element with a protection circuit, as per another example of the present subject matter.

FIG. 2 illustrates a block diagram of an interface element 200 implementing a protection circuit 202. An interface element may include any element or connector which enables connection of a computing device, such as computing device 100, with another electronic device. Examples of an interface element 200 include, but are not limited to, a plug and a receptacle. The plug may include prolonged connecting pins which, when inserted, fit into a mating socket of a receptacle. Different types of interfaces may have plugs and corresponding receptacles which may differ in shape, size, and function. An example of such an interface includes, but is not limited to, a USB Type-C interface.

Returning to the present example, the protection circuit 202 comprises a first circuit branch 204 and a second circuit branch 206. The first circuit branch 204 may further include a capacitive element 208. The capacitive element 208 may be implemented using one of a single capacitor, and a combination of multiple capacitors. In another example, the capacitive element 208 may be implemented using a variable capacitor. The second circuit branch 206, on the other hand, includes a resistive element 210, wherein the resistive element 210 may be implemented using one of a single resistor, combination of multiple resistors, and a variable resistor.

The capacitance of the capacitive element 208 and the impedance of the resistive element 210 may be such that the impedance offered to a varying current by the capacitive element 208 of the first circuit branch 204 would be less than the impedance offered by the resistive element 210 of the second circuit branch 206. In an example, first circuit branch 204 and the second circuit branch 206 may be connected to a first grounded terminal 212 and as second grounded terminal 214, respectively.

The first circuit branch 204 and the second circuit branch 206 may be further connected to an ESD module 216. The ESD module 216 may be further coupled to a plurality of input lines (not shown in FIG. 2), wherein such input lines may include one of a data line, a control line, and a power line. In operation, the protection circuit 202 may protect the components of a computing device connected to the interface element 200 against certain electrical anomalies, such as an ESD and a reverse DC operated voltage. In the event of an ESD, a resulting discharge voltage in the form of a voltage spike may be generated at the input lines coupled to the ESD module 216. The discharge voltage, once generated, passes through the ESD module 216. Thereafter, the ESD module 216 may suppress the discharge voltage to a predefined reference voltage. Once suppressed, the discharge voltage may be routed through the capacitive element 208 provided within the first circuit branch 204. Since the first circuit branch 204 is connected to the first grounded terminal 212, the discharge voltage routed through the capacitive element 208 is grounded, and hence removed.

In another example, it may be the case that a reverse DC operated voltage may occur owing to an improper alignment of connecting pins, when a plug of the interface is inserted into a corresponding receptacle. The reverse DC operated voltage may be within a range of about 5 V to about 20 V. The reverse DC operated voltage may then be routed through the resistive element 210 of the second circuit branch 206. As the reverse DC operated voltage flows through the second circuit branch 206, the impedance offered by the resistive element 210 results in a potential drop which reduces the reverse DC operated voltage. The potential drop in the reverse DC operated voltage is dependent on the impedance of the resistive element 210. To such an end, the impedance of the second circuit branch 206 may be such that the reverse DC operated voltage reduces to a value which is less than a predefined permissible limit. The predefined permissible limit may be such that it conforms to the operating voltage characteristics of either the computing device, or the electronic device which may be coupled to such a computing device. Since the second circuit branch 206 is also connected to the second grounded terminal 214, the reverse DC operated voltage is pulled to ground, and is thus eliminated by the protection circuit 202.

Figure 3:
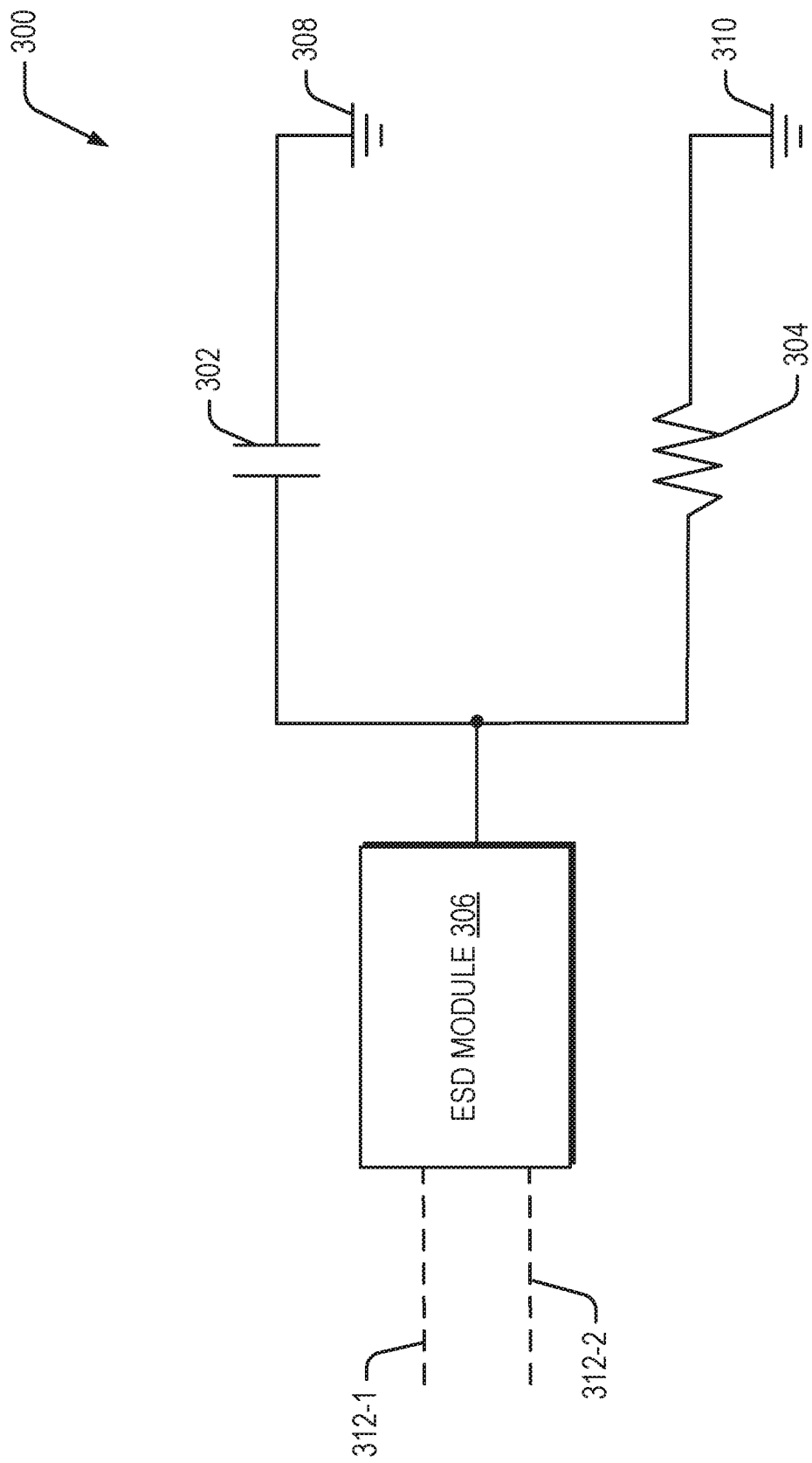
FIG. 3 illustrates a block diagram of a protection circuit, as per an example of the present subject matter.

FIG. 3 illustrates another block diagram of a protection circuit 300. The protection circuit 300 may be implemented within a variety of systems, such as computing device (e.g., computing device 100 as explained in conjunction with FIG. 1), an electronic device, a peripheral device, and an interface element (such as the interface element 200).

The protection circuit 300 comprises capacitor 302 and a resistor 304. One terminal of the capacitor 302 and the resistor 304 is connected to the ESD module 306. In an example, the other respective terminals of the capacitor 302 and the resistor 304 are connected to a first grounded terminal 308 and a second grounded terminal 310, respectively. Although depicted as single unit, the capacitor 302 and the resistor 304 may be implemented as a combination of different capacitors and resistors, without deviating from the scope of the present subject matter. In an example, the capacitance of the capacitor 302 and the impedance of the resistor 304 may be such that the impedance offered to an electrical current by the capacitor 302 would be less than the impedance offered by the resistor 304.

The ESD module 306 may be further coupled to a plurality of input lines 312-1, 312-2 (collectively referred to as input lines 312 and shown in dotted lines). The input lines 312 of the protection circuit 300 are to connect with one of a data line, a control line, and a power line of the system within which the protection circuit 300 is implemented. In operation, the protection circuit 300 may protect the components of the system within which the protection circuit 300 is implemented against ESD and a reverse DC operated voltage.

In one example, it may be the case that a reverse DC operated voltage may occur owing to improper alignment of a plug of the interface being inserted into a corresponding receptacle of the system. The capacitor 302 is to block the reverse DC operated voltage. Thereafter, the reverse DC operated voltage may then be routed through the resistor 304. As the reverse DC operated voltage flows through the resistor 304, the impedance offered by the resistor 304 results in a potential drop which reduces the reverse DC operated voltage in the protection circuit 300. The potential drop in the reverse DC operated voltage is dependent on the impedance of the resistor 304. Therefore, a higher value of impedance of the resistor 304 will consequently result in a greater drop in the reverse DC operated voltage.

In another example, on occurrence of an ESD a discharge voltage may be generated at the input lines 312. ESD may occur when a plug is removed from its corresponding receptacle. The discharge voltage, once generated, passes through the ESD module 306. The ESD module 306 may suppress the discharge voltage based on a predefined reference voltage. Owing to the lesser impedance offered by the capacitor 302, the suppressed discharge voltage is routed through the capacitor 302. Since the capacitor 302 is connected to the first grounded terminal 308, the discharge voltage routed through the capacitor 302 is grounded, and hence removed. In this manner, the discharge voltages produced as a result of the ESD may be removed.

Figure 4:
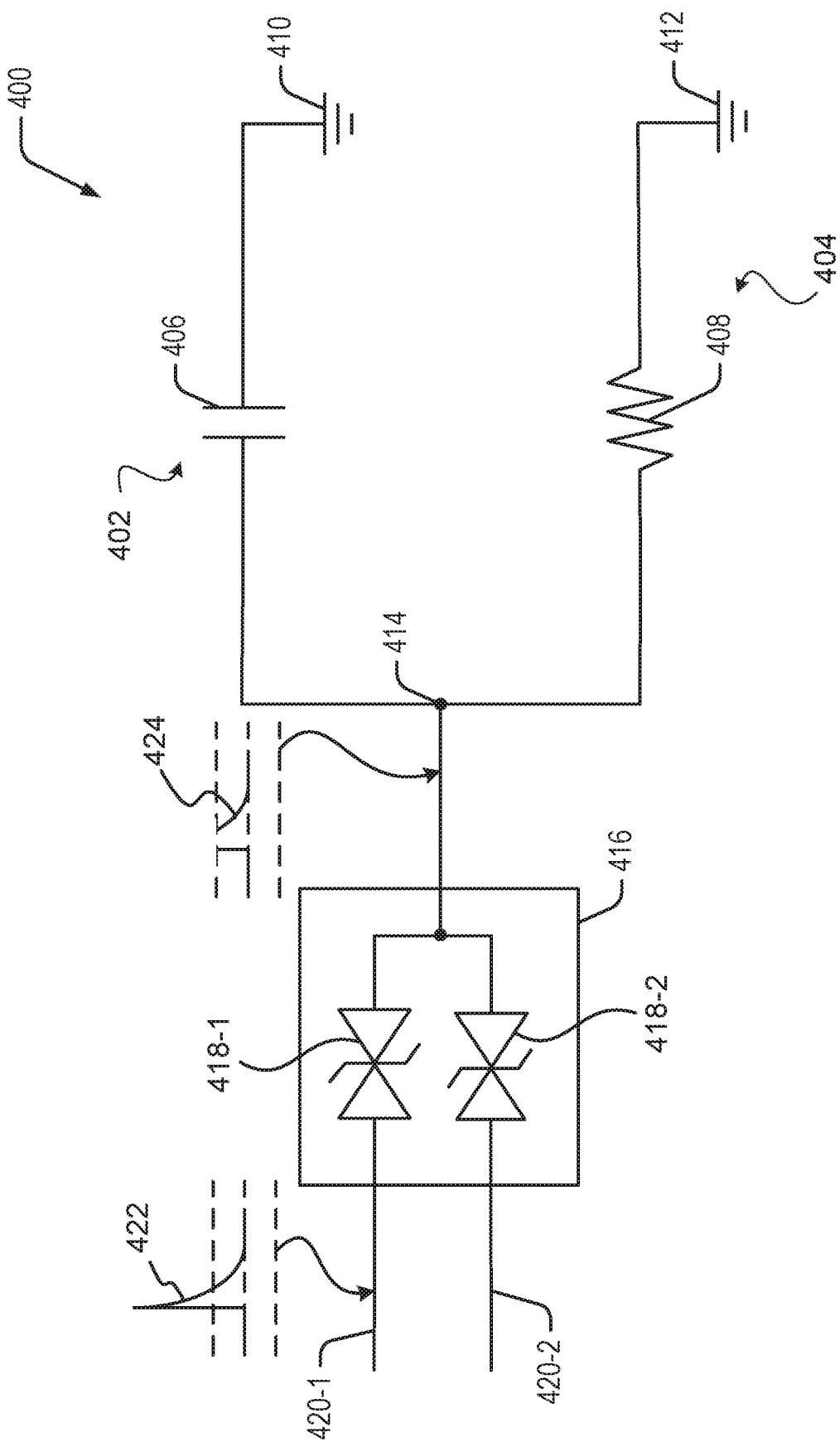
FIG. 4 illustrates a circuit diagram of a protection circuit, as per another example of the present subject matter.

FIG. 4 illustrates a circuit diagram of another example protection circuit 400. Similar to the protection circuit 300, the protection circuit 400 may be implemented within a variety of systems, such as a computing device (e.g., the computing device 100 as explained in conjunction with FIG. 1), an electronic device, a peripheral device, and an interface element (such as the interface element 200). The protection circuit 400 comprises a first circuit branch 402 and a second circuit branch 404. The first circuit branch 402 may further include a capacitive element 406. Although depicted as a single capacitor, the capacitive element 406 may be implemented using a combination of multiple capacitors without deviating from the scope of the present subject matter. The second circuit branch 404, on the other hand, includes a resistive element 408. The resistive element 408 may be a single resistor. In another example, the resistive element 408 may be implemented as combination of multiple resistors. It may be noted that other combinations of resistors may be alternatively used to implement the resistive element 408. In an example, the first circuit branch 402 and the second circuit branch 404 may be connected to respective grounded terminals 410 and 412.

The capacitance of the capacitive element 406 and the impedance of the resistive element 408 may be such that the impedance offered to a varying current by the capacitive element 406 of the first circuit branch 402 would be less than the impedance offered by the resistive element 408 of the second circuit branch 404. In an example, the capacitance of the capacitive element 406 may be about 100 nF. In another example, the impedance of the resistive element 408 may be about 10 kΩ.

Continuing with the present example, the first circuit branch 402 and the second circuit branch 404 may further converge to a node 414. The node 414 may be further coupled to an ESD module 416. The ESD module 416 includes a set of clamping diodes 418-1 and 418-2 (collectively referred to as clamping diodes 418). In an example, the clamping diodes 418 may be bidirectional. In addition to the clamping diodes 418, the ESD module 416 may further include additional components and circuitry, without deviating from the scope of the present subject matter. The ESD module 416 may be further coupled with input lines 420-1 and 420-2 (collectively referred to as input lines 420). The input lines 420 of the protection circuit 400 are to connect with one of a data line, a control line, and a power line of the system within which the protection circuit 400 is implemented.

The protection circuit 400 offers protection against a variety of electrical anomalies, such as ESD and any reverse DC operated voltage, which may arise due to an inadvertent shorting between incorrect pins. The operation of the protection circuit 400 is further explained in conjunction with an example voltage spike depicted as voltage 422. The voltage 422 may be generated pursuant to an electrostatic discharge (or ESD). Although depicted as a single spike, the voltage 422 may include a series of pulses, without deviating from the scope of the present subject matter.

The voltage 422 may appear at the input lines 420. The voltage 422 is then passed through the ESD module 416. The clamping diodes 418 of the ESD module 416 suppresses the voltage 422 to a reference voltage. In an example, the specific level may be such that it conforms with certain operating voltages of the system within which the protection circuit 400 is implemented. Proceeding further, owing to the action of the clamping diodes 418, a suppressed voltage 424 is provided as output by the ESD module 416.

As described above, the first circuit branch 402 has a lower impedance as compared to the impedance of the second circuit branch 404. The lower impedance of the first circuit branch 402, results in the suppressed voltage 424 to flow through the first circuit branch 402. With the first circuit branch 402 being connected to the grounded terminal 410, the suppressed voltage 424 is eliminated. In this manner, a voltage spike (depicted as voltage 422) occurring due to the ESD may be eliminated.

A reverse DC operated voltage may occur owing to improper alignment when a plug of the interface is inserted into a corresponding receptacle. Such a reverse DC operated voltage may be around 5V and may be as high as 20V, in certain cases. The reverse DC operated voltage present at the input lines 420 may pass through the ESD module 416. The capacitive element 406 present in the first circuit branch 402 completely blocks the reverse DC operated voltage owing to which the reverse DC operated voltage flows through the second circuit branch 404. As mentioned earlier with respect to the present example, the resistive element 408 may be of a high resistance. Owing to the high impedance offered by the resistive element 408, the resulting potential drop is high. Furthermore, since the second circuit branch 404 is also connected to the grounded terminal 412, the reverse DC operated voltage is pulled to ground, and is thus eliminated by the protection circuit 400.

The protection circuit 400 may be utilized for eliminating discharge voltages that may arise due to ESD, as well as for eliminating reverse DC operated voltages to the grounded terminal.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A computing device comprising:
    a protection circuit for an interface of the computing device, wherein the protection circuit comprises:
        an electrostatic discharge (ESD) module to suppress a discharge voltage caused due to an electrostatic discharge, wherein the ESD module is to be coupled to a plurality of input lines including a power line,
        a capacitive branch directly coupled between the ESD module and ground, wherein the capacitive branch is to route the suppressed discharge voltage; and
        a resistive branch coupled between the ESD module and ground, wherein the resistive branch is to route a reverse direct current (DC) operated voltage produced at the interface.

2. The computing device as claimed in claim 1, wherein the interface is one of a High Definition Multimedia Interface (HDMI), a Video Graphic Array (VGA) interface, a Digital Visual Interface (DVI), and a Universal Serial Bus (USB) Type-C interface.

3. The computing device as claimed in claim 1, wherein an impedance of the capacitive branch is less than an impedance of the resistive branch.

4. The computing device as claimed in claim 1, wherein the ESD module comprises a clamping diode, wherein the clamping diode is to suppress the discharge voltage to a reference voltage.

5. The computing device as claimed in claim 1, wherein the resistive branch comprises a resistive element having an electrical resistance of a value greater than 10 kiloohms (kΩ).

6. The computing device as claimed in claim 1, wherein the capacitive branch comprises a capacitive element having a capacitance of a value of about 100 nano-farads (nF).

7. The computing device of claim 1, wherein the capacitive branch is coupled to a first grounding terminal, and the resistive branch is coupled to a second grounding terminal.

8. The computing device of claim 1, further comprising a node coupled to the ESD module, and both the capacitive branch and the resistive branch are coupled between the node and ground.

9. The computing device of claim 1, wherein the capacitive branch is to block the reverse DC operated voltage.

10. An interface element comprising:
    a protection circuit integrated within the interface element, wherein the protection circuit comprises:
        an electrostatic discharge (ESD) module to suppress a discharge voltage caused due to an electrostatic discharge, wherein the ESD module is to be coupled to a plurality of input lines including a power line;
        a first circuit branch directly coupled to the ESD module and comprising a capacitive element, wherein the first circuit branch is connected between the ESD module and a first grounded terminal and is to route a suppressed discharge voltage; and
        a second circuit branch coupled to the ESD module and comprising a resistive element, wherein the second circuit branch is connected between the ESD module and a second grounded terminal and is to route a reverse direct current (DC) operated voltage.

11. The interface element as claimed in claim 10, wherein the ESD module further comprises a clamping diode, and wherein the ESD module is to suppress the discharge voltage to provide the suppressed discharge voltage corresponding to a reference voltage.

12. The interface element as claimed in claim 11, wherein the suppressed discharge voltage conforms with an operating voltage of an electronic device coupled to the interface element.

13. The interface element as claimed in claim 10, wherein an impedance of the resistive element is greater than an impedance offered by the capacitive element.

14. The interface element as claimed in claim 10, wherein a capacitance of the capacitive element in the first circuit branch is of a value of about 100 nF and an impedance of the resistive element in the second circuit branch is of a value greater than 10 kΩ.

15. The interface element as claimed in claim 10, wherein the reverse DC operated voltage is within a range from about 5V to about 20V.

16. A protection circuit for an interface, the protection circuit comprising:
    an electrostatic discharge (ESD) module to suppress a discharge voltage caused due to an electrostatic discharge, wherein the ESD module is to be coupled to a plurality of input lines including a power line;

a capacitor directly coupled between the ESD module and a first grounded terminal, wherein the capacitor is connected to a first grounded terminal and is to route the suppressed discharge voltage to the first grounded terminal; and a resistor coupled between the ESD module and a second grounded terminal, wherein the resistor is to route a reverse direct current (DC) operated voltage to the second grounded terminal.

17. The protection circuit as claimed in claim 16, wherein the capacitor is to block the reverse DC operated voltage.

18. The protection circuit as claimed in claim 16, wherein the ESD module comprises a bidirectional clamping diode, wherein the bidirectional clamping diode is to suppress the discharge voltage to a reference voltage.

\* \* \* \* \*